(12) United States Patent
Yui et al.

(10) Patent No.: US 7,675,997 B2
(45) Date of Patent: Mar. 9, 2010

(54) DYNAMIC DC OFFSET REMOVAL APPARATUS AND DYNAMIC DC OFFSET REMOVAL METHOD

(75) Inventors: Tomohiro Yui, Kanagawa (JP); Nobuhiro Takagi, Kanagawa (JP); Gou Kaise, Kanagawa (JP)

(73) Assignee: Panasonic Corporation, Osaka (JP)

( * ) Notice: Subject to any disclaimer, the term of this patent is extended or adjusted under 35 U.S.C. 154(b) by 770 days.

(21) Appl. No.: 11/539,334

(22) Filed: Oct. 6, 2006

(65) Prior Publication Data

US 2007/0081616 A1  Apr. 12, 2007

(30) Foreign Application Priority Data

Oct. 7, 2005  (JP) ............... 2005-295432

(51) Int. Cl.
*H04L 25/10*  (2006.01)
(52) U.S. Cl. .................. 375/319; 375/324; 375/344; 455/67.11; 455/136; 455/226.1
(58) Field of Classification Search ............... 375/317, 375/319, 324, 344, 354, 260, 285; 455/67.11, 455/136, 182.2, 192.2, 226.1
See application file for complete search history.

(56) References Cited

U.S. PATENT DOCUMENTS

| | | | |
|---|---|---|---|
| 5,748,681 A | 5/1998 | Comino et al. | |
| 6,707,860 B1 | 3/2004 | Sevenhans | |
| 6,724,247 B2 * | 4/2004 | Mattisson et al. | ........... 329/318 |
| 6,947,495 B2 * | 9/2005 | Ezquerra-Moreu et al. | .. 375/319 |
| 2002/0085649 A1 * | 7/2002 | Hwang | |

FOREIGN PATENT DOCUMENTS

| | | |
|---|---|---|
| EP | 1202511 | 5/2002 |
| JP | 2000-278335 | 10/2000 |

OTHER PUBLICATIONS

English language Abstract of JP 2000-278335.

* cited by examiner

*Primary Examiner*—Dac V Ha
(74) *Attorney, Agent, or Firm*—Greenblum & Bernstein P.L.C.

(57) ABSTRACT

A dynamic DC offset removal apparatus and a dynamic DC offset removal method capable of accurately estimating a change position of a dynamic DC offset and a DC offset value before the change and a DC offset value after the change, thereby carrying out equalization processing on a reception signal whose dynamic DC offsets are removed, and improving a bit error rate characteristic. In receiver 100 having a dynamic DC offset removal apparatus, dynamic DC offset detection section 109 calculates a DC offset value before the change and a DC offset value after the change, and DC offset change timing from the maximum value and minimum value calculated at maximum value search section 104 and minimum value search section 105 and the first-half mean value, second-half mean value and overall mean value calculated at first-half mean value calculation section 107, second-half mean value calculation section 108 and overall mean value calculation section 106, and compensation DC offset switching section 111 of DC offset removal section 110 switches between the DC offset value before the change and DC offset value after the change based on the DC offset change timing and removes dynamic DC offsets from the reception signal.

11 Claims, 8 Drawing Sheets

DYNAMIC DC OFFSET REMOVAL APPARATUS AND DYNAMIC DC OFFSET REMOVAL METHOD

BACKGROUND OF THE INVENTION

1. Field of the Invention

The present invention relates to a dynamic DC offset removal apparatus provided for a receiver in a radio communication and a dynamic DC offset removal method, and more particularly, to a dynamic DC offset removal apparatus and dynamic DC offset removal method mainly used for a receiver in a digital mobile communication mounted with a direct conversion scheme radio section.

2. Description of Related Art

Due to influences of multipath fading which may occur in a radio channel, a receiver in a digital mobile communication receives radio waves through a plurality of paths of different propagation times simultaneously. For this reason, delay distortion occurs in the reception signal and a bit error rate characteristic deteriorates. Since the delay distortion increases as a symbol rate increases, it will no longer be possible to ignore the influences of delay distortion in high-speed digital mobile communication devices in the future and it is becoming indispensable to remove the delay distortion.

An equalizer is a typical means for correcting the delay distortion. In a radio communication, equalizers are conventionally mounted in receivers which carry out high-speed transmission, and in recent years equalizers are also mounted, for example, in cellular phones of the GSM (Global System for Mobile Communications) which is the digital cellular phone standard in Europe. There are also a growing number of receivers which estimate a DC offset component which may occur mainly at a radio RF section by a mean value of reception signals and remove the DC offset component as pre-processing of the equalizer and thereby improve equalization accuracy and the bit error rate characteristic.

Figure 7:
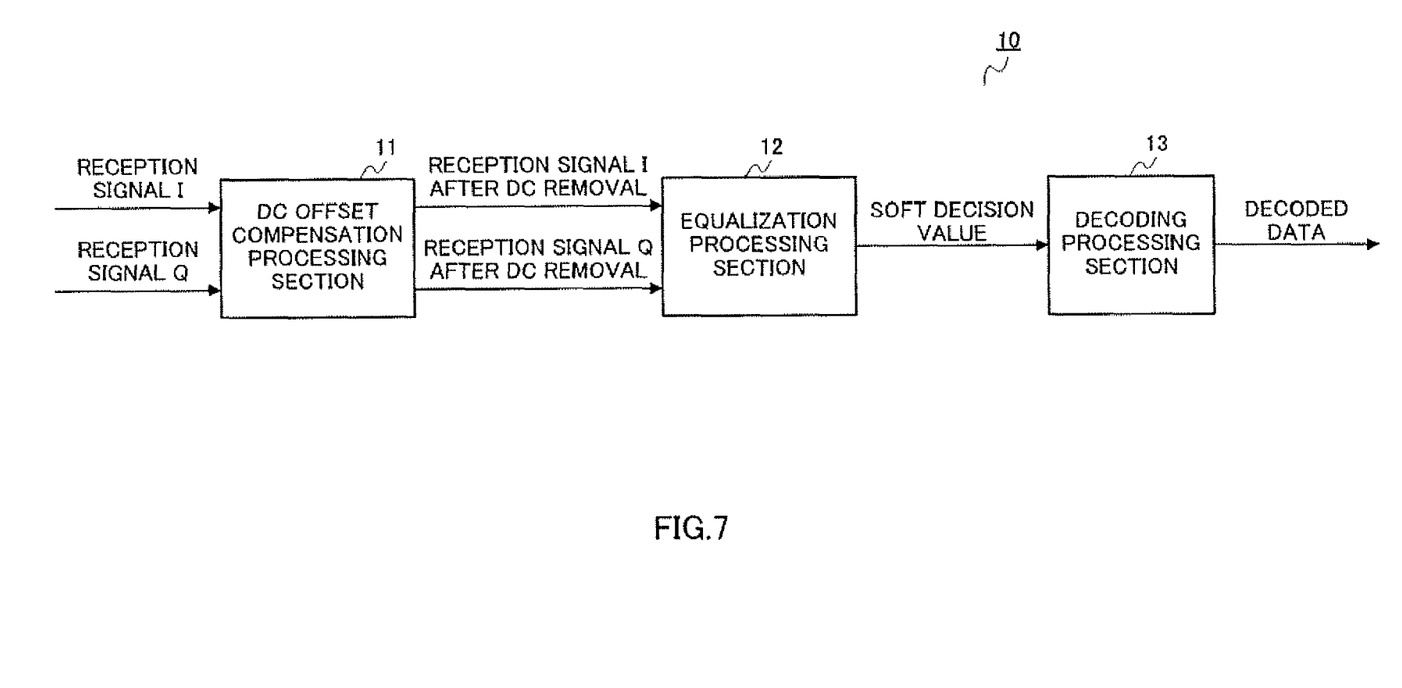
FIG. 7 is a block diagram showing a configuration of a receiver having a conventional DC offset removal apparatus.
Figure 8:
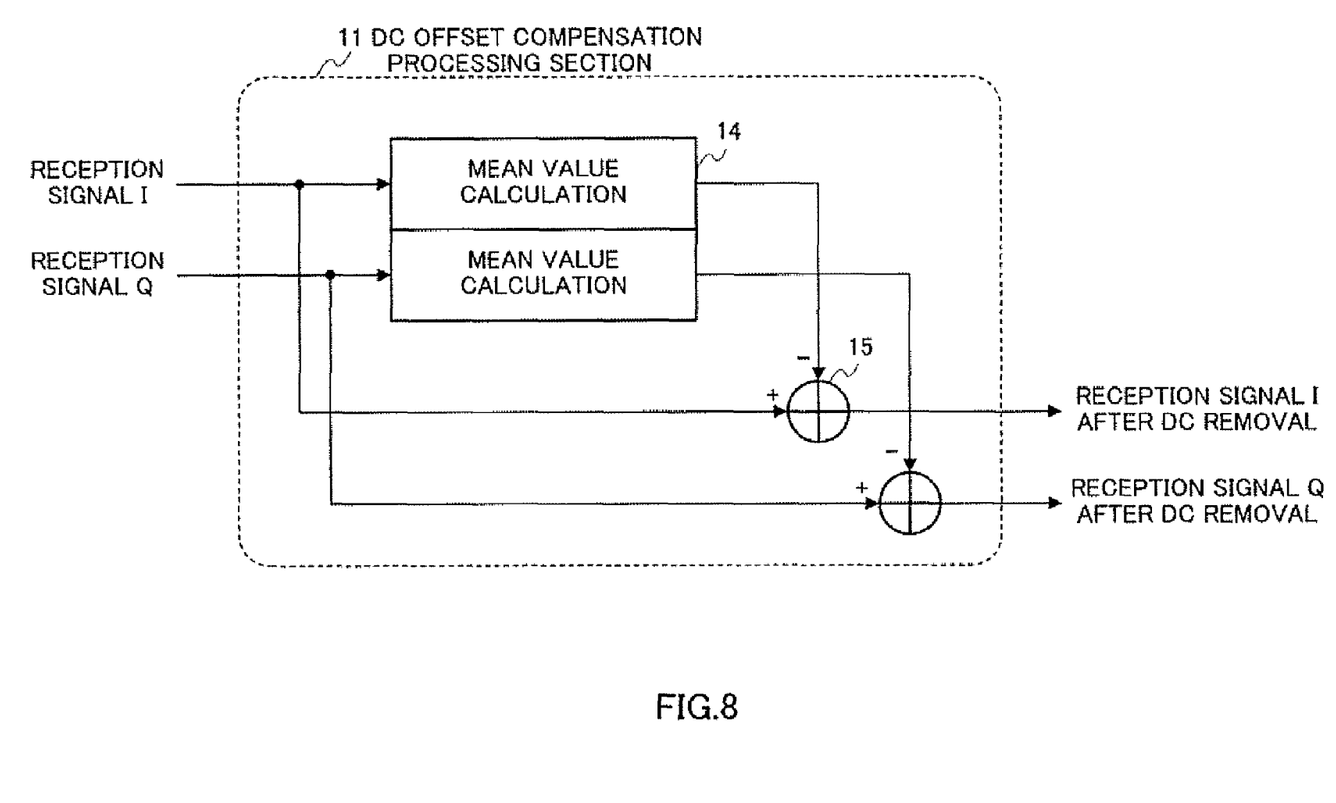
FIG. 8 illustrates a configuration of a DC offset compensation processing section of the conventional DC offset removal apparatus.

FIG. 7 is a block diagram showing a configuration of a receiver having a conventional DC offset removal apparatus and FIG. 8 illustrates the configuration of a DC offset compensation processing section therein. In FIG. 7 and FIG. 8, receiver 10 having a DC offset removal apparatus is configured with DC offset compensation processing section 11, equalization processing section 12 and decoding processing section 13. DC offset compensation processing section 11 is configured with mean value calculation section 14 and DC offset removal section 15. DC offset compensation processing section 11 estimates a DC offset component using a mean value of reception signals through mean value calculation section 14 and removes it through DC offset removal section 15.

In recent years, for the purpose of reducing the circuit scale (cost reduction) of a radio RF section, a direct conversion reception scheme is being adopted instead of a heterodyne reception scheme which converts a reception frequency to an intermediate frequency. However, with the introduction of the direct conversion reception scheme, in the narrowband digital modulation scheme used in the GSM or the like, a DC offset component remains in a receiver detection output (baseband reception signal) due to the fact that a reception signal frequency is equal to a local transmission frequency, in particular, a drastic increase (hereinafter referred to as "dynamic DC offset") of the DC offset occurs in the middle of a burst in the GSM, which is hardly removable by mean value estimation of the reception signals and may deteriorate the bit error rate characteristic.

To remove the dynamic DC offset, a conventional DC offset removal algorithm maps a digital baseband signal onto an IQ diagram, and determines I and Q coordinates of the center point by a two-dimensional fitting of geometric graphics using subsets of signal values. It is possible to capture a change of the dynamic DC offset by a change of the center point (for example, see Japanese Patent Application Laid-Open No. 2000-278335).

However, such a conventional DC offset removal apparatus has a problem that performing such arithmetic operations to determine a center point for arbitrary continuous subsets of the digital baseband signal causes an increase in the amount of processing.

SUMMARY OF THE INVENTION

It is therefore an object of the present invention to provide a dynamic DC offset removal apparatus and dynamic DC offset removal method capable of detecting and removing a dynamic DC offset which may occur in the middle of a burst with a relatively small amount of processing.

According to an aspect of the invention, the dynamic DC offset removal apparatus having: a maximum value/minimum value search section that calculates a maximum value and minimum value of a reception signal converted to a digital base band signal; a dynamic DC offset detection section that calculates a change time of a dynamic DC offset or a DC offset value before the change time or after the change time from said calculated maximum value and minimum value; and a DC offset removal section that switches between the calculated DC offset values according to the change time, and removes the dynamic DC offsets from the reception signal.

According to another aspect of the invention, the dynamic DC offset removal apparatus having: a mean value calculation section that divides an arbitrary period to a first-half, second-half and whole, and calculates a mean value of a reception signal in the first-half of the period, a mean value of the reception signal in the second-half of the period, and a mean value of the reception signal in the whole period, respectively; a dynamic DC offset detection section that calculates a DC offset value before a change, DC offset value after the change and DC offset change timing from the calculated first-half mean value, second-half mean value and overall mean value; and a DC offset removal section that switches between the DC offset value before the change and DC offset value after the change based on the calculated DC offset change timing, and removes the dynamic DC offsets from the reception signal.

According to a further aspect of the invention, the dynamic DC offset removal apparatus having: a maximum value/minimum value search section that calculates a maximum value and minimum value of a reception signal converted to a digital baseband signal; a mean value calculation section that divides an arbitrary period to a first-half, second-half and whole, and calculates a mean value of the reception signal in the first-half of the period, a mean value of the reception signal in the second-half of the period and a mean value of the reception signal in the whole period, respectively; a dynamic DC offset detection section that calculates a DC offset value before a change, DC offset value after the change and DC offset change timing from the maximum value and minimum value calculated by the maximum value/minimum value search section, the first-half mean value, second-half mean value and overall mean value calculated by the mean value calculation section; and a DC offset removal section that switches between the DC offset value before the change and DC offset value after the change based on the calculated DC offset change timing, and removes the dynamic DC offsets from the reception signal.

According to a still further aspect of the invention, a dynamic DC offset removal method having: a step of calculating a maximum value and minimum value of a reception signal converted to a digital baseband signal; a step of dividing an arbitrary period to a first-half, second-half and whole, and calculating a mean value of the reception signal in the first-half of the period, a mean value of the reception signal in the second-half of the period and a mean value of the reception signal in the whole period, respectively; a dynamic DC offset detection step of calculating a DC offset value before the change, DC offset value after the change and DC offset change timing from the maximum value, minimum value, first-half mean value, second-half mean value and overall mean value; and a step of switching between the DC offset value before the change and DC offset value after the change based on the DC offset change timing, and removing dynamic DC offsets from the reception signal.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which; The above and other objects and features of the invention will appear more fully hereinafter from a consideration of the following description taken in connection with the accompanying drawing wherein one example is illustrated by way of example, in which.

DESCRIPTION OF THE PREFERRED EMBODIMENT

With reference now to the attached drawings, a preferred embodiment of the present invention will be explained in detail below.

Embodiment

Figure 1:
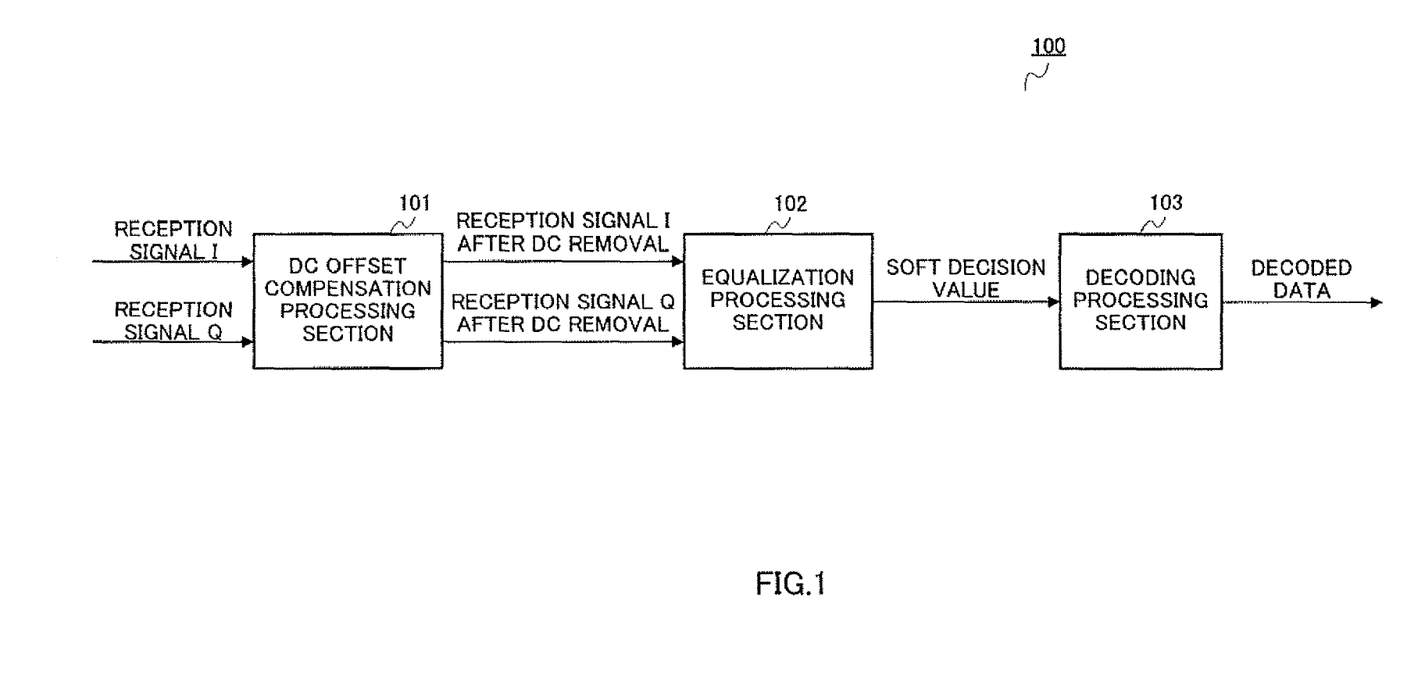
FIG. 1 is a block diagram showing a configuration of a receiver having a dynamic DC offset removal apparatus according to an embodiment of the present invention.

FIG. 1 is a block diagram showing the configuration of a receiver having a dynamic DC offset removal apparatus according to an embodiment of the present invention. This embodiment is an example where the present invention is adopted to a receiver in a digital mobile communication under the GSM scheme. Hereinafter, the "period" in the present specification refers to a "burst period" of reception processing of GSM and the unit is a second. Furthermore, this burst is the processing unit of the reception processing in GSM.

In FIG. 1, receiver 100 having a dynamic DC offset removal apparatus receives reception signals I and Q converted to digital baseband signals, and is provided with DC offset compensation processing section 101 that removes a DC offset from reception signals I and Q, equalization processing section 102 that equalizes the reception signals subjected to DC offset compensation processing after DC offset compensation and decoding processing section 103 that decodes the reception signal equalized at equalization processing section 102.

Figure 2:
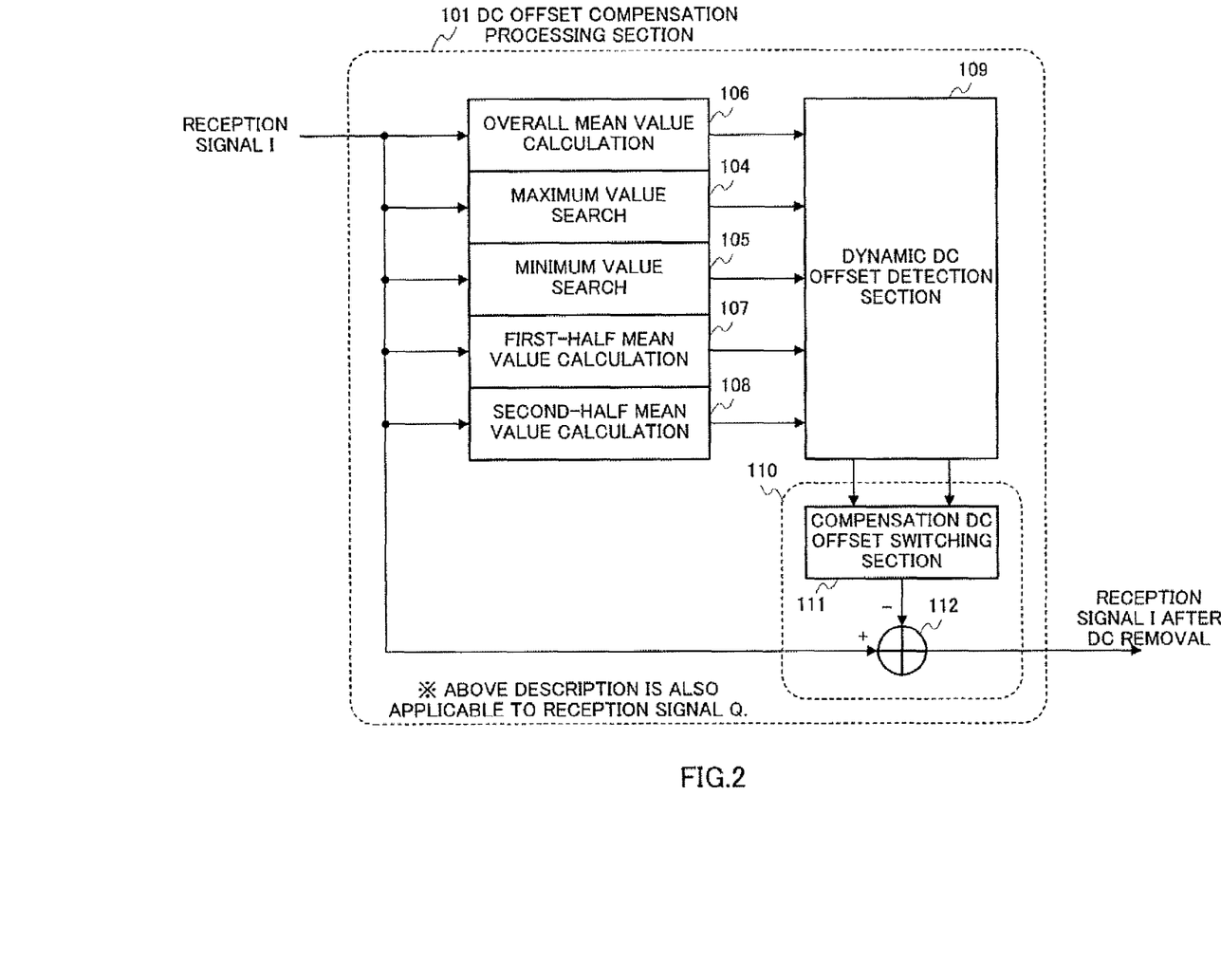
FIG. 2 is a view illustrating a configuration of a DC offset compensation processing section of the dynamic DC off set removal apparatus according to the above described embodiment.

FIG. 2 illustrates a configuration of above described DC offset compensation processing section 101. Since both I and Q phase components are subjected to the same processing separately, processing on the I phase will be explained as a representative.

In FIG. 2, DC offset compensation processing section 101 is configured with maximum value search section 104 for an I-phase signal; minimum value search section 105; overall mean value calculation section 106; first-half mean value calculation section 107; second-half mean value calculation section 108; dynamic DC offset detection section 109; and DC offset removal section 110. DC offset removal section 110 is configured with compensation DC offset switching section 111 and adder 112. Reception signal Q will also have a configuration same as that in FIG. 2.

Maximum value search section 104 calculates the maximum value of the reception signal (here, reception signal I, but the same will also apply to reception signal Q) and minimum value search section 105 calculates the minimum value of the reception signal.

Overall mean value calculation section 106 calculates a mean value of all reception signals for a certain period, first-half mean value calculation section 107 calculates a mean value of the reception signal in the first-half of the above described period and second-half mean value calculation section 108 calculates a mean value of the reception signal in the second-half of the above described period.

As described above, the above described period is a burst period of reception processing of the GSM, and the concrete physical amount is the "number of samples which can exist for a burst period."

Furthermore, the first-half of the period is the first-half part of a sample included in a burst which is the processing unit of the reception processing of the GSM (1 to N/2, when the number of samples included in the burst is supposed to be N) and the second-half of the period is the second-half part of the sample included in the burst (N/2 to N, when the number of samples included in the burst is supposed to be N) Expression (1) (described later) is developed assuming that the first-half and the second-half are divided at the center of the whole period.

Dynamic DC offset detection section 109 calculates a DC offset value before a change, DC offset value after the change and DC offset change timing from the maximum value and minimum value calculated at maximum value search section 104 and minimum value search section 105 and a first-half mean value, second-half mean value and overall mean value calculated at first-half mean value calculation section 107, second-half mean value calculation section 108 and overall mean value calculation section 106.

DC offset removal section 110 switches between the DC offset value before the change and DC offset value after the change by compensation DC offset switching section 111 based on the DC offset change timing calculated at dynamic DC offset detection section 109, and removes the DC offset value from the reception signal by adder 112.

Figure 3:
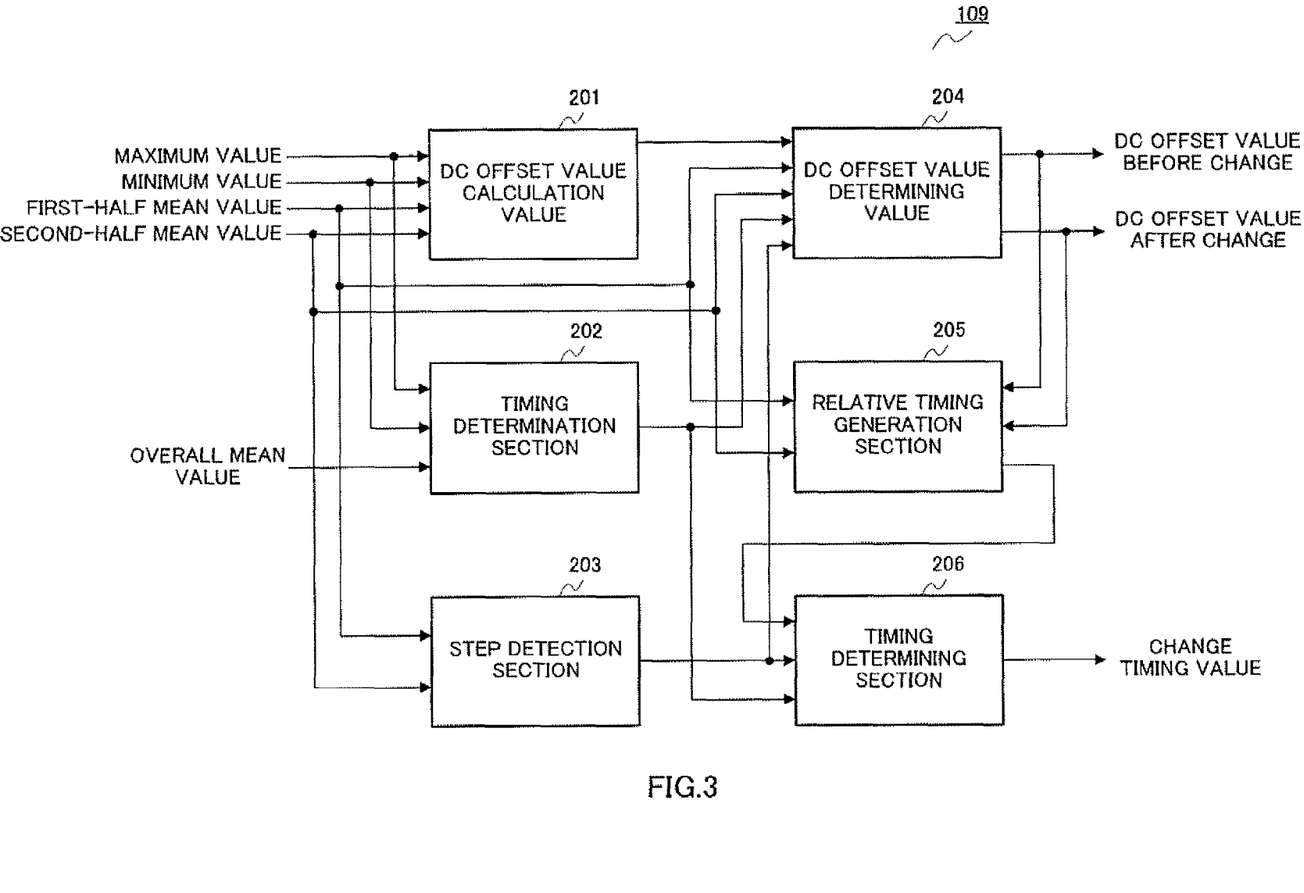
FIG. 3 is a block diagram showing a configuration of a dynamic DC offset detection section of the dynamic DC offset removal apparatus according to the above described embodiment.

FIG. 3 is a block diagram showing the configuration of above described dynamic DC offset detection section 109.

In FIG. 3, dynamic DC offset detection section 109 is configured with DC offset value calculation section 201; timing determination section 202; step detection section 203; DC offset value determining section 204; relative timing generation section 205; and timing determining section 206, and this configuration realizes Expression (1) (described later).

DC offset value calculation section 201 performs addition and subtraction so as to take a first-half mean value and second-half mean value from the sum of the maximum value and minimum value.

Timing determination section 202 determines whether the value obtained by subtracting twice the overall mean value from the sum of the maximum value and minimum value is positive or negative.

Step detection section 203 determines size of a first-half mean value and second-half mean value.

DC offset value determining section 204 selects a DC offset value before a change and a DC offset value after the change from the addition and subtraction result of DC offset value calculation section 201 or the first-half mean value or second-half mean value based on the positive/negative result at timing determination section 202 and the size result at step detection section 203.

Relative timing generation section 205 calculates the ratio of the difference between the first-half mean value and second-half mean value and the difference between the DC offset value before the change and the DC offset value after the change, and multiplies that ratio by half the number of samples which can exist for the period (burst period). The basis of the "half" of the above described period will be described. (1) When a DC offset is estimated by a mean value calculation, better estimation accuracy is obtained by averaging over the longest possible period (the largest possible number of samples). (2) Because a DC offset may change once in a step-like manner within a burst, a division that can capture that change is necessary. Assuming half the burst period is best to meet above (1) and (2), half the period is adopted in this example. Expression (1) (described later) corresponds to half the period. However, the method is not limited to a division by two and other division may also be used if at least the period is divided. For example, it is also possible to use a division by four if a little deterioration inaccuracy does not matter.

Timing determining section 206 selects the multiplication result at relative timing generation section 205 from the positive/negative result at timing determination section 202 and the size result of step detection section 203, or the subtraction result obtained by subtracting the multiplication result from the number of samples which can exist for the period (burst period). The above described multiplication result shows the multiplication result of Expression (1) (described later).

Figure 4:
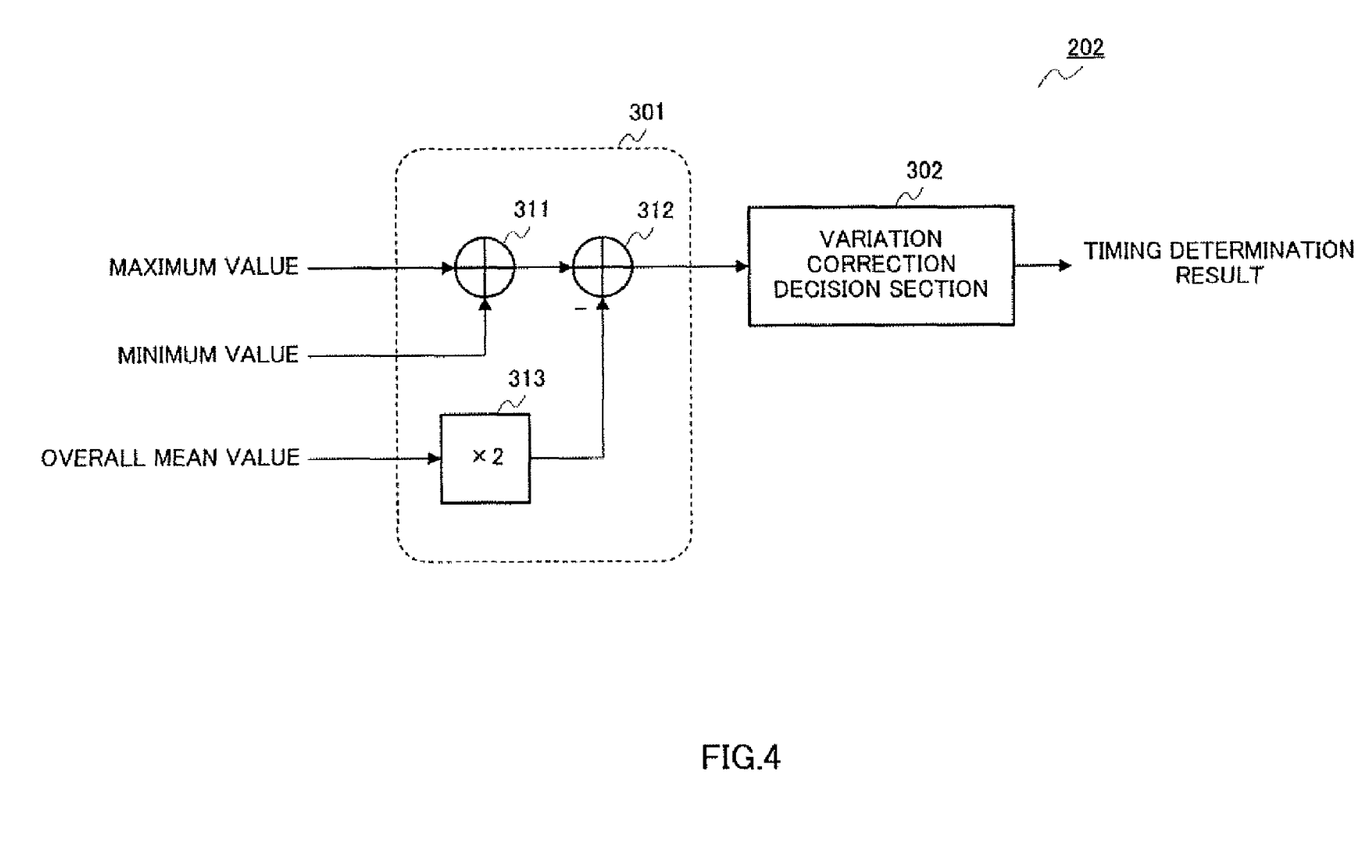
FIG. 4 is a block diagram showing a configuration of a timing determination section of the dynamic DC offset removal apparatus according to the above described embodiment.

FIG. 4 is a block diagram showing a configuration of above described timing determination section 202.

In FIG. 4, timing determination section 202 receives the maximum value, minimum value and overall mean value as inputs, and outputs the timing determination result, and is configured with timing calculation section 301 consists of adders 311 and 312 and multiply-by-two circuit 313, and variation correction decision section 302.

Timing calculation section 301 calculates a value obtained by subtracting twice the overall mean value from the sum of the maximum value and minimum value.

Variation correction decision section 302 determines whether the output of timing calculation section 301 is greater than a certain positive number or smaller than the negative number of the positive number.

This timing determination section 202 can reduce the possibility of erroneous determination due to variations of the maximum value, minimum value and overall mean value under the influences of noise and fading in a situation in which a dynamic DC offset does not change.

Figure 5:
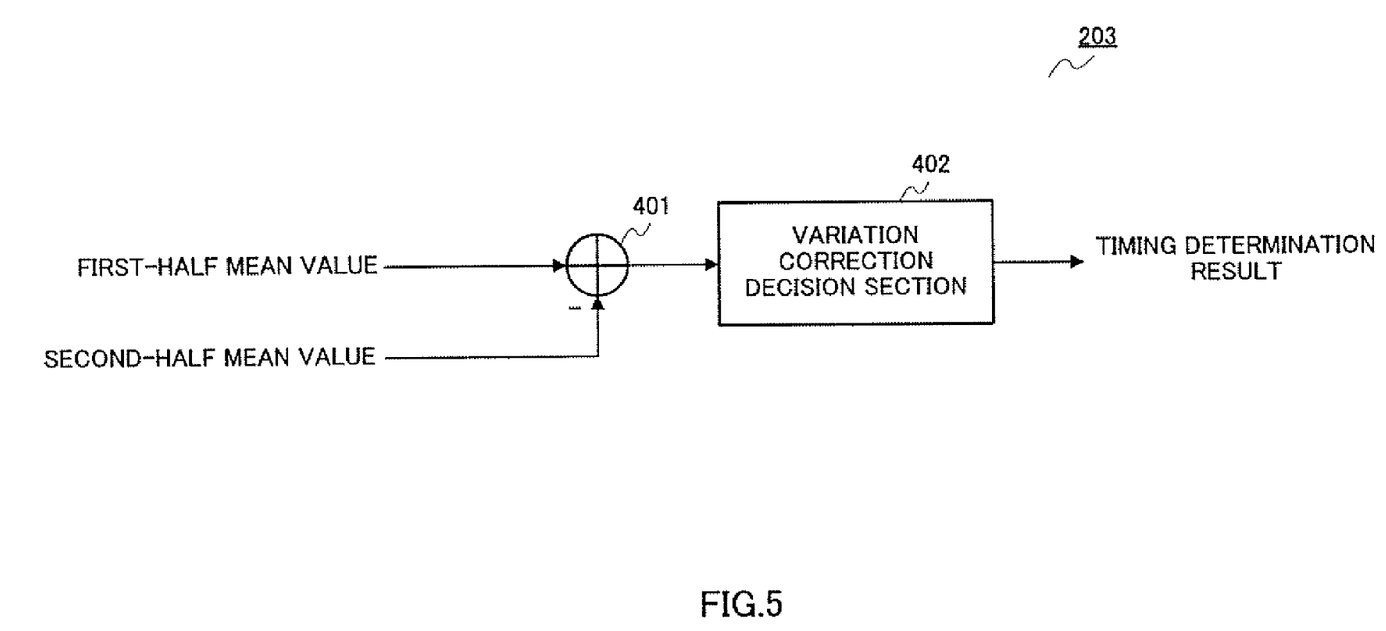
FIG. 5 is a block diagram showing a configuration of a step detection section of the dynamic DC offset removal apparatus according to the above described embodiment.

FIG. 5 is a block diagram showing the configuration of above described step detection section 203.

In FIG. 5, step detection section 203 is configured with step calculation section 401 provided with an adder receiving the first-half mean value and the second-half mean value as inputs and calculating a difference between the first-half mean value and second-half mean value and variation correction decision section 402 determining whether an output from step calculation section 401 is greater than a certain positive number or smaller than the negative number of the positive number.

In a situation in which there is no dynamic DC offset change, this step detection section 203 can reduce the possibility of erroneous determination due to variations of the first-half mean value and second-half mean value under the influences of noise and fading.

Figure 6:
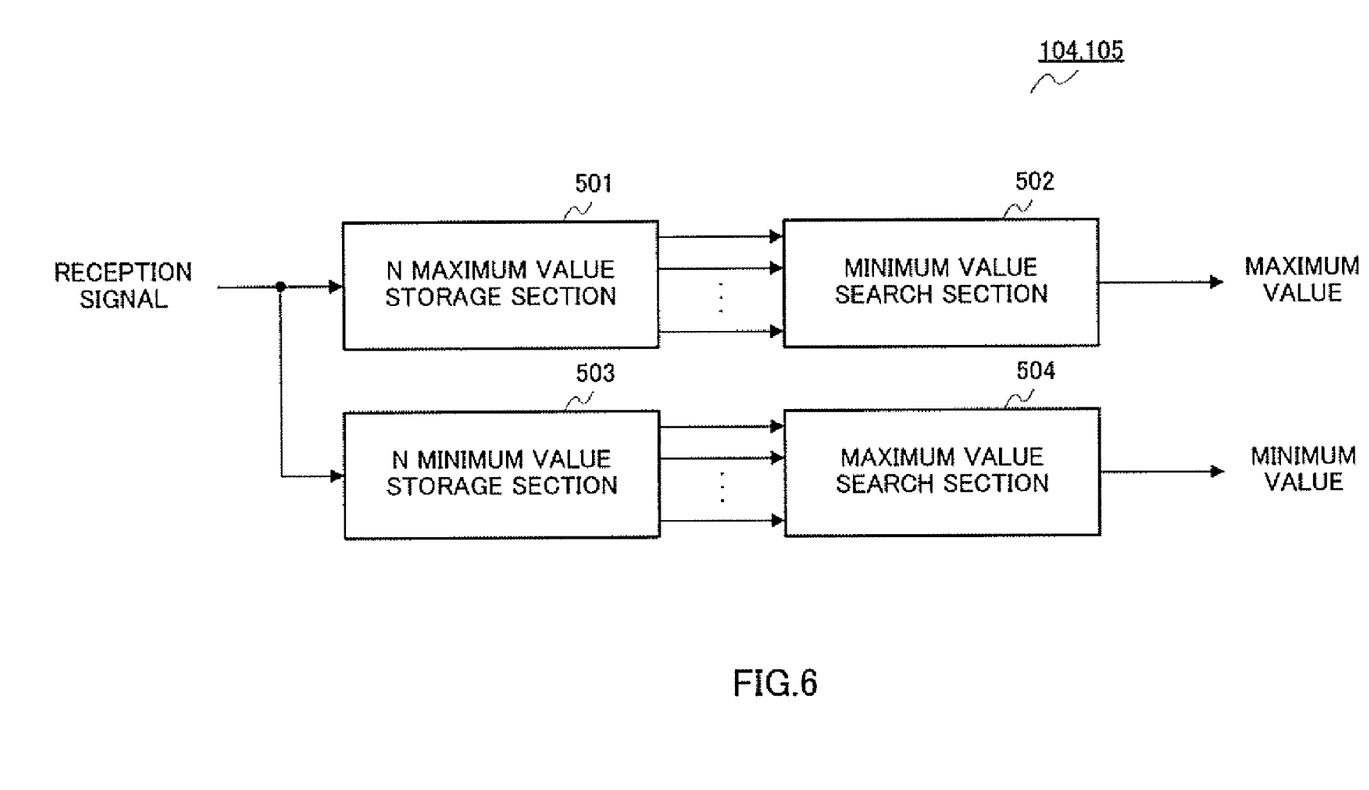
FIG. 6 is a block diagram showing a configuration of a maximum value search section and a minimum value search section of the dynamic DC offset removal apparatus according to the above described embodiment.

FIG. 6 is a block diagram showing the configuration of above described maximum value search section 104 and minimum value search section 105.

In FIG. 6, maximum value search section 104 and minimum value search section 105 receive the reception signals converted to digital baseband signals as inputs and are configured with N maximum value storage section 501 storing N maximum values; minimum value search section 502 searching a minimum value from the N outputs from N maximum value storage section 501; N minimum values storage section 503 storing N minimum values; and maximum value search section 504 searching a maximum value from N outputs from N minimum values storage section 503.

Maximum value search section 104 and minimum value search section 105 do not use values from the maximum value to Nth value for a maximum value search with respect to certain constant N or do not use values up to the Nth value from the minimum value for a minimum value search, so that it is possible to reduce the possibility of erroneous determination due to variations of the maximum value and minimum value under the influences of noise and fading.

Furthermore, maximum value search section 104 and minimum value search section 105 receive the reception signals converted to digital baseband signals as inputs, assume a value calculated from values from the maximum value to Kth value (K is a positive number greater than 1) as a maximum value of the whole or a value calculated from values from the minimum value to Lth value (L is a positive number greater than 1) as a minimum value of the whole, and can thereby reduce the possibility of erroneous determination due to variations of the maximum value and minimum value under the influences of noise and fading.

Hereinafter, the dynamic DC offset removal operations of receiver 100 having the dynamic DC offset removal apparatus configured as above will be explained.

The present invention receives a reception signal converted to a digital baseband signal as an input, assumes that the sampling period of the reception signal is Ts, burst period is Tb, the number of samples which can exist for a burst period is N (=Tb/Ts) and the reception signal is subjected to quadrature modulation into I phase and Q phase components. Hereinafter, both the I phase and Q phase components are subjected to the same processing separately, and therefore processing on the I phase component will be described as representative.

First, as shown in FIG. 1 and FIG. 2, maximum value search section 104 and minimum value search section 105 calculate the maximum value and minimum value of the reception signal respectively Furthermore, overall mean value calculation section 106, first-half mean value calculation section 107 and second-half mean value calculation section 108 calculate mean values of the reception signal with the first-half, second-half and overall mean value of the reception signal for the burst period respectively.

Next, dynamic DC offset detection section 109 calculates a DC offset value before a change, DC offset value after the change and DC offset change timing based on following Expression (1) from maximum value MAX and minimum value MIN calculated at maximum value search section 104 and minimum value search section 105 and first-half mean value AVF, second-half mean value AVS and overall mean value AVE calculated at overall mean value calculation section 106, first-half mean value calculation section 107 and second-half mean value calculation section 108.

The dynamic DC offset detected at dynamic DC offset detection section 109 is input to DC offset removal section 110, and compensation DC offset switching section 111 of DC offset removal section 110 switches DC offset values according to the change time. The change time of DC offset values described above is DC offset change timing calculated at dynamic DC offset detection section 109. Compensation DC offset switching section 111 switches between the DC offset value before the change and DC offset value after the change based on the DC offset change timing and removes the DC offset from the reception signal by adder 112.

Expression (1) is shown below.
If MAX+MIN≦2×AVE and AVF≦AVS,
DC offset value before change B=(MAX+MIN)−AVS
DC offset value after change A=AVS
DC offset change timing $$t=(N/2)\times(AVS-AVF)/(A-B)$$

If MAX+MIN>2×AVE and AVF≦AVS,
DC offset value before change B=AVF
DC offset value after change A=(MAX+MIN)−AVF
DC offset change timing $$t=N-(N/2)\times(AVS-AVF)/(A-B)$$

If MAX+MIN≦2×AVE and AVF>AVS,
DC offset value before change B=(MAX+MIN)−AVF
DC offset value after change A=AVF
DC offset change timing $$t=N-(N/2)\times(AVF-AVS)/(A-B)$$

If MAX+MIN>2×AVE and AVF>AVS,
DC offset value before change B=AVS
DC offset value after change A=(MAX+MIN)−AVS
DC offset change timing $$t=(N/2)\times(AVF-AVS)/(A-B) \quad (1)$$

Assuming that when there is a sample of an average value of the reception signal for a period long enough, the mean value of the reception signal becomes 0 if the DC offset component does not exist, and when the DC offset component does not exist, the distances from the mean values of the maximum value and the minimum value of the reception signal become equal, above described Expression (1) is derived from the following Expressions (2-1), (2-2) and (2-3).

If MAX+MIN≦2×AVE and AVF≦AVS, $$AVF=B+(A-B)\times(156-t)/156 \quad (2\text{-}1)$$

$$AVS=A \quad (2\text{-}2)$$

If MAX+MIN>2×AVE and AVF≦AVS, $$AVF=B \quad (2\text{-}1)$$

$$AVS=B+(A-B)\times(312-t)/156 \quad (2\text{-}2)$$

If MAX+MIN≦2×AVE and AVF>AVS $$AVF=A \quad (2\text{-}1)$$

$$AVS=B+(A-B)\times(t-156)/156 \quad (2\text{-}2)$$

If MAX+MIN>2×AVE and AVF>AVS $$AVF=B+(A-B)\times t/156 \quad (2\text{-}1)$$

$$AVS=B \quad (2\text{-}2)$$

$$MAX-A=B-MIN \quad (2\text{-}3)$$

By the above described technique, it is theoretically possible to accurately estimate the change position of the dynamic DC offset and DC offset value before the change and DC offset value after the change.

As explained in detail above, according to this embodiment, dynamic DC offset detection section 109 calculates a DC offset value before a change, DC offset value after the change and DC offset change timing from a maximum value and minimum value calculated at maximum value search section 104 and minimum value search section 105 and a first-half mean value, second-half mean value and overall mean value calculated at first-half mean value calculation section 107, second-half mean value calculation section 108 and overall mean value calculation section 106, Compensation DC offset switching section 111 of DC offset removal section 110 switches between the DC offset value before the change and DC offset change after the change based on the DC offset change timing and removes dynamic DC offsets from the reception signal. That is, the DC offset values before and after a change and the change timing of the DC offset value with respect to a dynamic DC offset which has changed within a certain period are derived, and DC offsets are removed according to the change timing. This makes it possible to remove dynamic DC offsets from the reception signal, removal of which has been difficult through conventional mean value estimation. Furthermore, compared to the technology like the apparatus in Patent Document 1 where a calculation to determine a center point is implemented with respect to arbitrary continuous subsets of a digital baseband signal, it is possible to derive DC offset values before and after the change and the change timing with less amount of processing. By carrying out equalization processing on the reception signal whose dynamic DC offset has been removed, it is possible to realize a receiver with an improved bit error rate characteristic.

Furthermore, by determining whether a value obtained by subtracting twice the overall mean value from the sum of the maximum value and minimum value is greater than a certain positive number or smaller than the negative number of the positive number, this embodiment can reduce the possibility of erroneous determination due to variations of the maximum value, minimum value and overall mean value under the influences of noise and fading in a situation in which there is no dynamic DC offset change.

Furthermore, by determining whether a difference between the first-half mean value and the second-half mean value is greater than a certain positive number or smaller than the negative number of the above described positive number, it is possible to reduce the possibility of erroneous determination due to variations of the first-half mean value and second-half mean value under the influences of noise and fading in a situation in which there is no dynamic DC offset change.

Moreover, when the timing determination result from timing determination section 202 is false or the step determination result from step detection section 203 is false, this embodiment has a function of performing switching so as to prevent processing of dynamic DC offset removal. Therefore, in a situation in which there is no dynamic DC offset variation, it is possible to reduce the possibility of removal of dynamic DC offsets when erroneous determination has occurred due to variations of the first-half mean value, second-half mean value, the above described maximum value and minimum value under the influences of noise and fading.

The above explanations are quoted by way of illustration of a preferred embodiment of the present invention and the present invention is not limited to this.

Furthermore, this embodiment has used terms such as "dynamic DC offset removal apparatus" and "dynamic DC offset removal method", but these are just for convenience of the explanations, and, for example, a "DC offset correction circuit" and a "DC offset correction method" can also be used.

Furthermore, the type, the number and the method of connecting various circuit sections constituting the above described DC offset removal apparatus including, for example, the mean value calculation sections, maximum value/minimum value search sections, and furthermore configuration examples of the timing determination section, step detection section, relative timing generation section or the like are not limited to the above described embodiment.

As described above, according to the present invention, it is possible to accurately estimate a change position of a dynamic DC offset, DC offset value before a change and DC offset value after the change and accurately compensate for dynamic DC offsets using a relatively small-scale circuit or with a small amount of processing. As a result, by performing equalization processing to the reception signal whose dynamic DC offset has been removed, it is possible to improve the bit error rate characteristic and minimize deterioration in the reception characteristic.

Therefore, the dynamic DC offset removal apparatus and the dynamic DC offset removal method according to the present invention can be used as part of reception processing of a cellular phone for a mobile communication. Especially, under the GSM scheme centered on Europe and the EDGE (Enhanced Data GSM Environment) scheme as the third version of that, it is possible to contribute to the realization of low cost cellular phones or extension of a standby time and talk time. Furthermore, the present invention is suitable for use in a receiver in a digital mobile communication mounted with a radio section of a direct conversion scheme.

The present invention is not limited to the above described embodiments, and various variations and modifications may be possible without departing from the scope of the present invention.

This application is based on the Japanese Patent Application No. 2005-295432 filed on Oct. 7, 2005, entire content of which is expressly incorporated by reference herein.

What is claimed is:

1. A dynamic DC offset removal apparatus comprising:
a maximum value/minimum value search section that calculates a maximum value and minimum value of a reception signal converted to a digital baseband signal;
a dynamic DC offset detection section that calculates a change time of a dynamic DC offset, a DC offset value before the change time, and a DC offset value after the change time from said calculated maximum value and minimum value; and
a DC offset removal section that switches between said calculated DC offset value before said change time and said calculated DC offset value after said change time, and removes the dynamic DC offsets from said reception signal.

2. A dynamic DC offset removal apparatus comprising:
a mean value calculation section that divides an arbitrary period to a first-half, second-half and whole, and calculates a mean value of a reception signal in the first-half of said period, a mean value of the reception signal in the second-half of said period, and a mean value of the reception signal in said whole period, respectively;
a dynamic DC offset detection section that calculates a DC offset value before a change, DC offset value after the change and DC offset change timing from the calculated first-half mean value, second-half mean value and whole mean value; and
a DC offset removal section that switches between the DC offset value before said change and DC offset value after said change based on said calculated DC offset change timing, and removes the dynamic DC offsets from said reception signal.

3. A dynamic DC offset removal apparatus comprising:
a maximum value/minimum value search section that calculates a maximum value and minimum value of a reception signal converted to a digital baseband signal;
a mean value calculation section that divides an arbitrary period to a first-half, second-half and whole, and calculates a mean value of the reception signal in the first-half of said period, a mean value of the reception signal in the second-half of said period and a mean value of the reception signal in said whole period, respectively;
a dynamic DC offset detection section that calculates a DC offset value before a change, DC offset value after the change and DC offset change timing from the maximum value and minimum value calculated by said maximum value/minimum value search section, the first-half mean value, second-half mean value and whole mean value calculated by said mean value calculation section; and
a DC offset removal section that switches between the DC offset value before said change and DC offset value after said change based on said calculated DC offset change timing, and removes the dynamic DC offsets from said reception signal.

4. The dynamic DC offset removal apparatus according to claim 3, wherein said dynamic DC offset detection section comprises:
a DC offset value calculation section that performs addition and subtraction calculations where said first-half mean value and said second-half mean value are subtracted from the sum of said maximum value and said minimum value;
a timing determination section that determines whether a value obtained by subtracting twice said overall mean value from the sum of said maximum value and said minimum value is positive or negative;

a step detection section that determines a size of said first-half mean value and said second-half mean value;

a DC offset value determining section that selects the DC offset value before the change and the DC offset value after the change from the addition and subtraction result of said DC offset value calculation section or said first-half mean value or said second-half mean value from the positive/negative result at said timing determination section and the size result at said step detection section;

a relative timing generation section that calculates a ratio of a difference between said first-half mean value and said second-half mean value and a difference between the DC offset value before said change and the DC offset value after said change, and multiplies the ratio by half the number of samples which can exist for said period; and a timing determination section that selects a multiplication result at said relative timing generation section from the positive/negative result of said timing determination section and the size result of said step detection section or the subtraction result obtained by subtracting said multiplication result from the number of samples which can exist for said period, and outputs the selected result as a change timing value.

5. The dynamic DC offset removal apparatus according to claim 3, wherein said maximum value/minimum value search section receives the reception signal converted to the digital baseband signal as an input, and does not use values up to an Nth value from the maximum value for a maximum value search with respect to constant N (N is an arbitrary natural number) or does not use values up to an Nth value from the minimum value for a minimum value search.

6. The dynamic DC offset removal apparatus according to claim 3, wherein said maximum value/minimum value search section receives the reception signal converted to the digital baseband signal as an input, assumes a value calculated from values from the maximum value to Kth (K is a positive number greater than 1) value as a maximum value of the whole or a value calculated from values from the minimum value to Lth (L is a positive number greater than 1) value as a minimum value of the whole.

7. The dynamic DC offset removal apparatus according to claim 3, wherein said timing determination section receives said maximum value and said minimum value, said whole mean value as inputs and determines whether a value obtained by subtracting twice said whole mean value from the sum of said maximum value and said minimum value is greater than a predetermined positive number or smaller than the negative number of said positive number.

8. The dynamic DC offset removal apparatus according to claim 3, wherein said step detection section receives said first-half mean value and said second-half mean value as inputs and determines whether a difference between said first-half mean value and said second-half mean value is greater than a predetermined positive number or smaller than the negative number of said positive number.

9. The dynamic DC offset removal apparatus according to claim 3, wherein when the timing determination result by said timing determination section is false or the step determination result by said step detection technique is false, switching is performed so as to prevent processing of dynamic DC offset removal.

10. A dynamic DC offset removal method comprising:

calculating, by a processing apparatus, a maximum value and minimum value of a reception signal converted to a digital baseband signal;

dividing an arbitrary period to a first-half, second-half and whole, and calculating a mean value of the reception signal in the first-half of the period, a mean value of the reception signal in the second-half of period and a mean value of the reception signal in the whole period, respectively;

detecting a dynamic DC offset by calculating a DC offset value before the change, a DC offset value after the change and DC offset change timing from the maximum value, minimum value, first-half mean value, second-half mean value and whole mean value; and switching, by a switching apparatus, between the DC offset value before the change and the DC offset value after the change based on the DC offset change timing, and removing dynamic DC offsets from the reception signal.

11. The dynamic DC offset removal method according to claim 10, wherein detecting the dynamic DC offset comprises:

performing addition and subtraction where the first-half mean value and the second-half mean value are subtracted from the sum of the maximum value and the minimum value;

determining whether a value obtained by subtracting twice the whole mean value from the sum of the maximum value and the minimum value is positive or negative;

determining size of the first-half mean value and the second-half mean value;

selecting the DC offset value before the change and the DC offset value after the change from the addition and subtraction result or the first-half mean value or the second-half mean value from the positive/negative result and the size result;

calculating a ratio of a difference between the first-half mean value and the second-half mean value and a difference between the DC offset value before the change and the DC offset value after the change, multiplying the ratio by half the number of samples which can exist for the period, and generating relative timing; and selecting the subtraction result obtained by subtracting the multiplication result from the number of samples which can exist for the period from the positive/negative result and the size result, and outputting the selected result as a change timing value.

* * * * *